(12) United States Patent
Lu (10) Patent No.: US 12,436,579 B2
(45) Date of Patent: Oct. 7, 2025

(54) SERVER ACCOMMODATING TWO MOTHERBOARDS

(71) Applicants: SQ TECHNOLOGY(SHANGHAI) CORPORATION, Shanghai (CN); INVENTEC CORPORATION, Taipei (TW)

(72) Inventor: Xiaogang Lu, Shanghai (CN)

(73) Assignees: SQ TECHNOLOGY(SHANGHAI) CORPORATION, Shanghai (CN); INVENTEC CORPORATION, Taipei (TW)

( * ) Notice: Subject to any disclaimer, the term of this patent is extended or adjusted under 35 U.S.C. 154(b) by 159 days.

(21) Appl. No.: 18/244,702

(22) Filed: Sep. 11, 2023

(65) Prior Publication Data
US 2025/0071927 A1     Feb. 27, 2025

(30) Foreign Application Priority Data
Aug. 22, 2023     (CN) .......................... 202311066727.5

(51) Int. Cl.
G06F 1/18     (2006.01)
H05K 7/14     (2006.01)

(52) U.S. Cl.
CPC ........... G06F 1/184 (2013.01); H05K 7/1487 (2013.01)

(58) Field of Classification Search
CPC ......... G06F 1/184; H05K 7/1487; H05K 7/16
See application file for complete search history.

(56) References Cited

U.S. PATENT DOCUMENTS

| 8,976,536 B2 * | 3/2015 | French, Jr. ........... H05K 7/1427 361/755 |
| 2009/0086422 A1 * | 4/2009 | McClure ............ H05K 7/20727 361/679.48 |

* cited by examiner

*Primary Examiner* — James Wu
(74) *Attorney, Agent, or Firm* — Maschoff Brennan (57) ABSTRACT

A server configured to accommodate two motherboards. The server includes a casing, two supporting assemblies and an upper tray. The casing includes a bottom plate and two side plates. The two side plates are connected to two opposite sides of the bottom plate. The two supporting assemblies include two fixed supporting members and two movably supporting members. The two fixed supporting members are fixed to the two side plates. The two movably supporting members are movably disposed on the two side plates. A side of the upper tray is pivoted to the two movably supporting members. Another side of the upper tray is movably disposed on the two fixed supporting members. The two motherboards are disposed on the upper tray and the bottom plate, respectively.

10 Claims, 10 Drawing Sheets

SERVER ACCOMMODATING TWO MOTHERBOARDS

CROSS-REFERENCE TO RELATED APPLICATIONS

This non-provisional application claims priority under 35 U.S.C. § 119(a) on Patent Application No(s). 202311066727.5 filed in China, on Aug. 22, 2023, the entire contents of which are hereby incorporated by reference.

BACKGROUND OF THE INVENTION

Technical Field of the Invention

The invention relates to a server, more particularly to a server having double-layer motherboards.

Description of the Related Art

Nowadays, the information technology develops rapidly. Most of enterprises may do various tasks on the business via a server, such as storing data. Accordingly, the efficiency of doing tasks on the business can be improved.

Generally, manufacturers install double-layer motherboards in the server to further improve the efficiency of doing tasks on the business. When electronic components of a lower motherboard in the conventional server with double-layer motherboards need to be replaced, an upper motherboard needs to be removed firstly so as to expose the lower motherboard. Then, after the electronic components of the lower motherboard are replaced, the upper motherboard is assembled back to the server. However, complicated steps of disassembly and assembly cause inconvenient of replacement of the electronic components. Therefore, how to improve the convenience of replacement of the electronic components on the motherboard is an important issue to be solved.

SUMMARY OF THE INVENTION

The invention provides a server so as to improve the convenience of replacement of the electronic components on the motherboard.

One embodiment of the invention provides a server configured to accommodate two motherboards. The server includes a casing, at least one supporting assembly and an upper tray. The casing includes a bottom plate and two side plates. The two side plates are connected to two opposite sides of the bottom plate, respectively. The at least one supporting assembly includes at least one fixed supporting member and at least one movably supporting member. The at least one fixed supporting member is fixed to one of the two side plates. The at least one movably supporting member is movably disposed on one of the two side plates. The at least one movably supporting member and the at least one fixed supporting member are located on a same one of the two side plates. A side of the upper tray is pivotally disposed on the at least one movably supporting member. Another side of the upper tray is movably disposed on the at least one fixed supporting member. The upper tray and the at least one movably supporting member are movable relative to the at least one fixed supporting member. The upper tray is rotatable relative to the at least one movably supporting member. One of the two motherboards is disposed on the upper tray. Another of the two motherboards is disposed on the bottom plate.

According to the server disclosed by the above embodiment, since the two fixed supporting member and the two movably supporting members are disposed on the casing of the server, the upper tray does not need to be removed when the electronic components of the motherboard disposed on the lower tray need to be replaced. The motherboard disposed on the lower tray can be exposed via translational movement and rotation of the upper tray. Accordingly, the convenience of replacing electronic components can be enhanced.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 1:
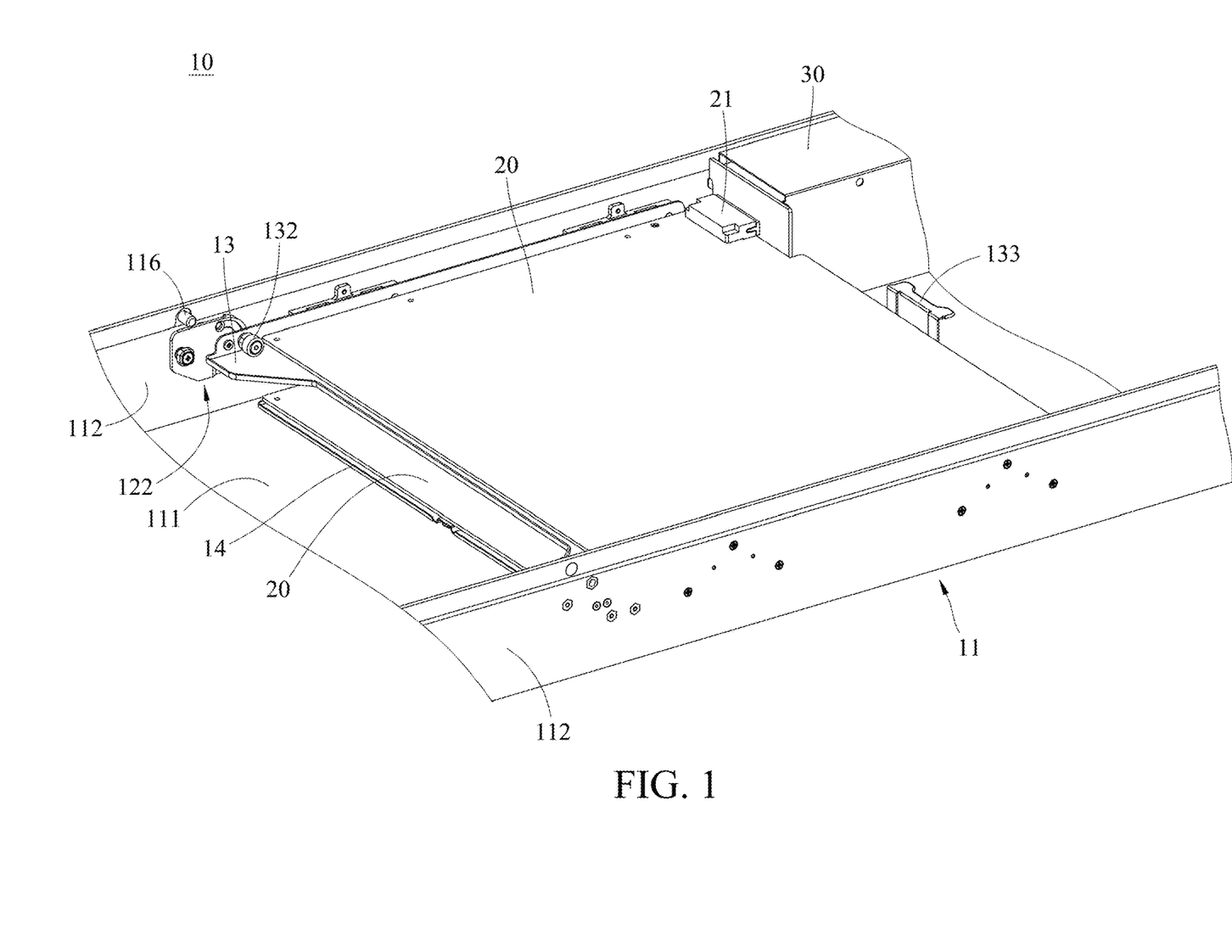
FIG. 1 is a perspective view of a server in accordance with one embodiment of the invention.
Figure 2:
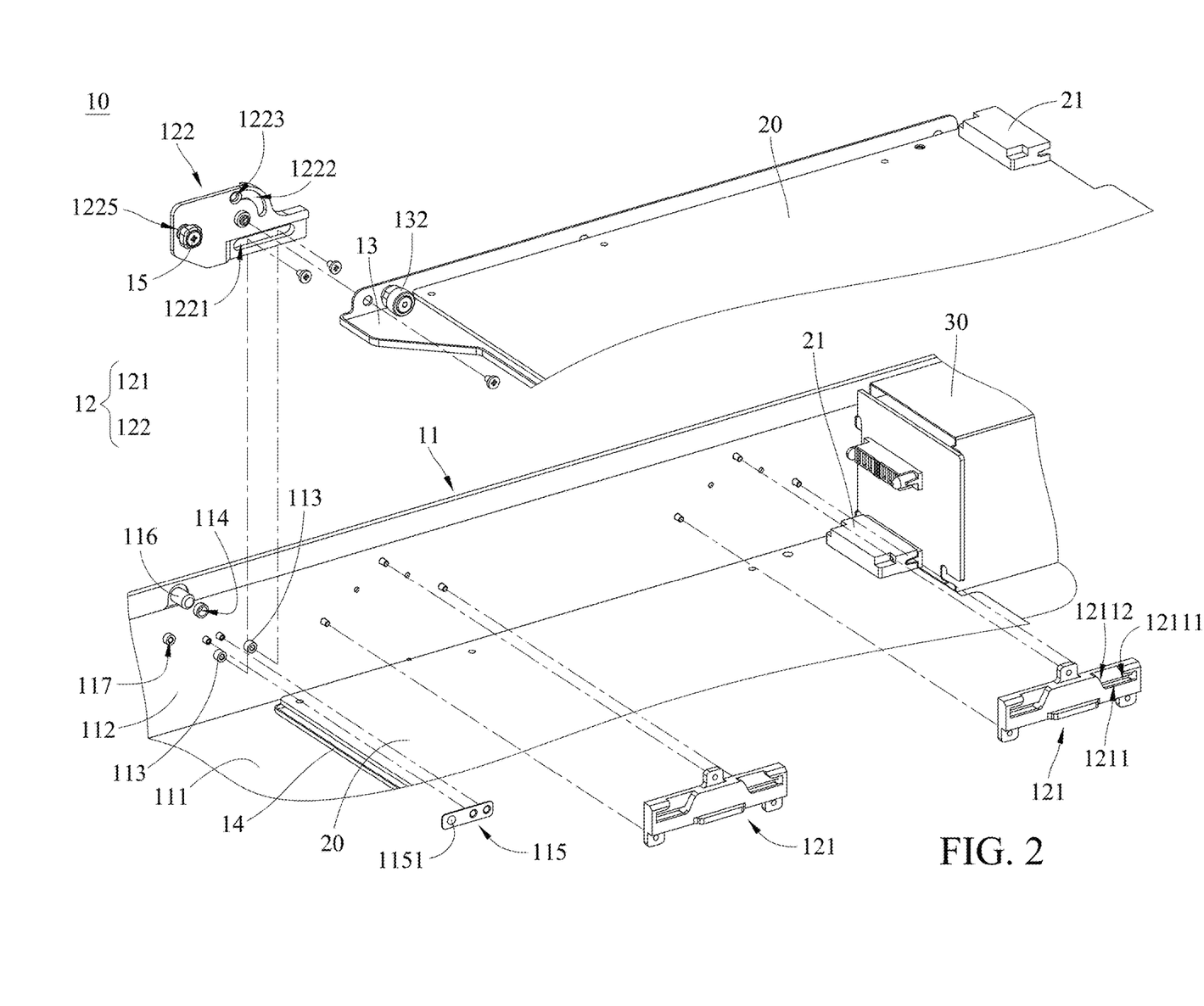
FIG. 2 is an exploded view of the server in FIG. 1.
Figure 3:
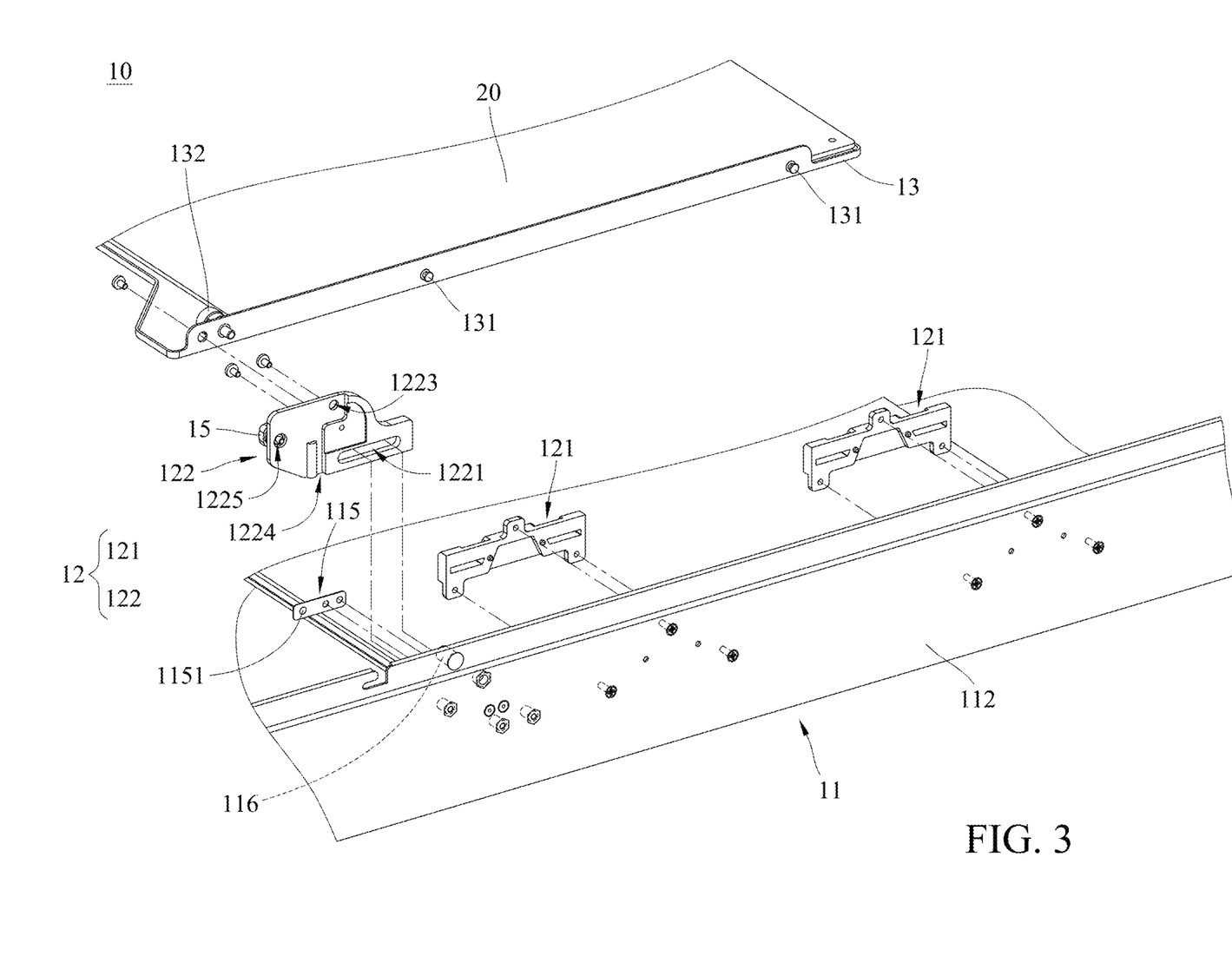
FIG. 3 is another exploded view of the server in FIG. 1.

Please refer to FIG. 1 to FIG. 3, where FIG. 1 is a perspective view of a server 10 in accordance with one embodiment of the invention, FIG. 2 is an exploded view of the server 10 in FIG. 1, and FIG. 3 is another exploded view of the server 10 in FIG. 1.

In this embodiment, the server 10 is, for example, configured to accommodate two motherboards 20 having electrical connectors 21. The electrical connectors 21 are electrically connected to, for example, a power supply 30. The server 10 includes a casing 11, two supporting assemblies 12, an upper tray 13 and a lower tray 14. A height of the casing 11 is, for example, 2U. The casing 11 includes a bottom plate 111 and two side plates 112. The two side plates 112 are connected to two opposite sides of the bottom plate 111, respectively. Each supporting assembly 12 includes two fixed supporting members 121 and a movably supporting member 122.

Figure 4:
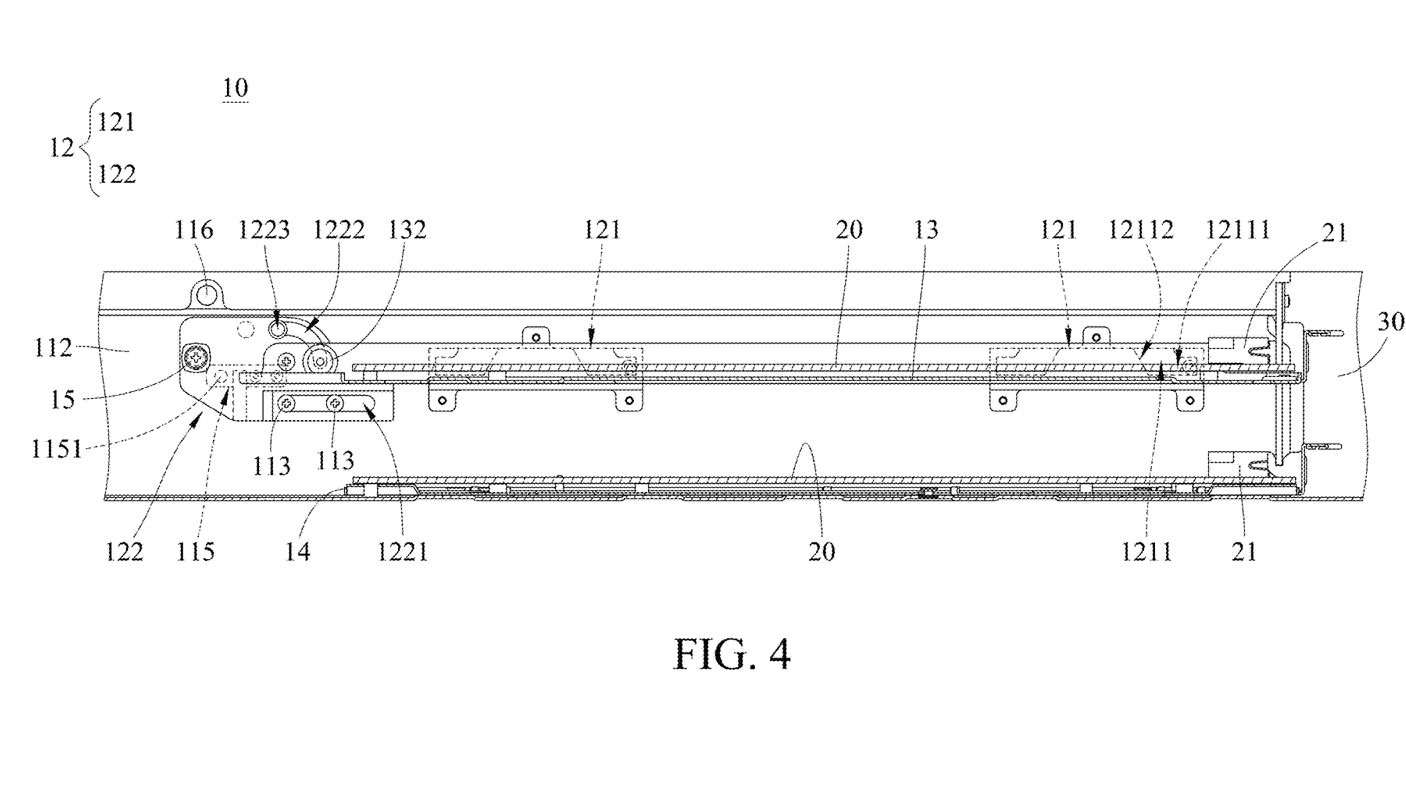
FIG. 4 is a cross-sectional view of the server in FIG. 1.

Please refer to FIG. 1 to FIG. 4, where FIG. 4 is a cross-sectional view of the server 10 in FIG. 1. The four fixed supporting members 121 are fixed to the two side plates 112, respectively, and are arranged symmetrically. That is, two of the fixed supporting members 121 are disposed on one of the side plates 112, and the other two fixed supporting members 121 are disposed on the other side plate 112. Distances between the two fixed supporting members 121 located on a same one of the two side plates 112 and the power supply 30 are different. Since the four fixed supporting members 121 are arranged symmetrically, and structures of the four fixed supporting members 121 are the same, only one fixed supporting member 121 will be described below. The fixed supporting member 121 has a first guiding groove 1211. The first guiding groove 1211 has a lateral guiding portion 12111 and an oblique guiding portion 12112. An end of the lateral guiding portion 12111 is connected to an end of the oblique guiding portion 12112.

The two movably supporting members 122 are movably disposed on the two side plates 112, respectively, and are arranged symmetrically. In addition, since structures of the two movably supporting members 122 are the same, only one movably supporting member 122 will be described below. The movably supporting member 122 has a second guiding groove 1221, an arc-shaped groove 1222 and a first through hole 1223. The first through hole 1223 is located on an end of the arc-shaped groove 1222.

A side of the upper tray 13 is pivotally disposed on to the two movably supporting members 122, and another side of the upper tray 13 is movably disposed on the four fixed supporting members 121. Accordingly, the upper tray 13 and the two movably supporting members 122 are movable relative to the four fixed supporting members 121, and the upper tray 13 is rotatable relative to the two movably supporting members 122. The lower tray 14 is, for example, fixedly disposed on the bottom plate 111. The two motherboards 20 are disposed on the upper tray 13 and the lower tray 14, respectively.

Specifically, two opposite sides of the upper tray 13 include four first guiding protrusions 131 and two first positioning members 132, and the four first guiding protrusions 131 and the two first positioning members 132 are arranged symmetrically. Two opposite sides of the casing 11 include four second guiding protrusions 113, and have two positioning holes 114. The four second guiding protrusions 113 and the two positioning holes 114 are symmetrically located on the two side plates 112, respectively. That is, two of the second guiding protrusions 113 are disposed on one of the side plates 112, and the other two second guiding protrusions 113 are disposed on the other side plate 112.

The four first guiding protrusions 131, the two first positioning members 132, the four second guiding protrusions 113 and the two positioning holes 114 are arranged symmetrically. In addition, structures of the four first guiding protrusions 131 are the same, structures of the two first positioning members 132 are the same, structures of the four second guiding protrusions 113, and structures of the two positioning holes 114 are the same. Therefore, only one first guiding protrusion 131, one first positioning member 132, two second guiding protrusions 113 located on a same one of the two side plates 112 and one positioning hole 114 will be described below.

The first guiding protrusion 131 is movably located in the first guiding groove 1211. The two second guiding protrusions 113 are located in the second guiding groove 1221. The movably supporting member 122 is movable relative to the two second guiding protrusions 113. Accordingly, the upper tray 13 can be forced to be located in an operational position or a translation position. In addition, the first positioning member 132 is movably located in the arc-shaped groove 1222. The positioning hole 114 is located at the side plate 112, and corresponds to the first through hole 1223.

When the first guiding protrusion 131 is located at an end of the lateral guiding portion 12111 farthest away from the oblique guiding portion 12112 and an end of the second guiding groove 1221 contacts one of the second guiding protrusions 113, the upper tray 13 is located in the operational position. At this time, the motherboard 20 disposed on the upper tray 13 is electrically connected to the power supply 30 via one of the electrical connector 21.

When the first guiding protrusion 131 is moved to the end of the lateral guiding portion 12111 connected to the oblique guiding portion 12112, and the movably supporting member 122 is moved such that another end of the second guiding groove 1221 contacts the other second guiding protrusion 113, the upper tray 13 is located in the translation position. At this time, the motherboard 20 disposed on the upper tray 13 is separated from the power supply 30.

When the upper tray 13 is located in the translation position, the first positioning member 132 is located at an end of the arc-shaped groove 1222 farthest away from the first through hole 1223. When the first positioning member 132 is moved to the first through hole 1223 in the arc-shaped groove 1222 and the first guiding protrusion 131 is moved from the end of the lateral guiding portion 12111 connected to the oblique guiding portion 12112 toward the end of the oblique guiding portion 12112 farthest away from the lateral guiding portion 12111, the upper tray 13 is moved from the translation position to a rotated position. That is, the upper tray 13 can be flipped open via the movably supporting member 122 to expose the lower tray 14.

After the upper tray 13 is moved from the translation position to the rotated position, the first positioning member 132 passes through the first through hole 1223 and is positioned in the positioning hole 114 so as to fix the upper tray 13 on the side plate 112 in position. Accordingly, the upper tray 13 can be firmly positioned in the rotated position.

In this embodiment, the casing 11 may further include two second positioning members 115. The two second positioning members 115 are disposed on the two side plates 112, respectively, and are arranged symmetrically. Each second positioning member 115 is located between the side plate 112 and the movably supporting member 122. Each movably supporting member 122 may further have a positioning recess 1224, and the two positioning recesses 1224 are arranged symmetrically. The two second positioning members 115 and the two positioning recesses 1224 are arranged symmetrically. In addition, structures of the two second positioning members 115 are the same, and structures of the two positioning recesses 1224 are the same. Therefore, only one second positioning member 115 and one positioning recess 1224 will be described below.

The second positioning member 115 includes a positioning protrusion 1151. When the upper tray 13 is located in the rotated position, the positioning protrusion 1151 of the second positioning member 115 is positioned in the positioning recess 1224. Accordingly, when the upper tray 13 is moved from the translation position to the rotated position, the movably supporting member 122 can be prevented from moving relative to the upper tray 13 via a positioning between the positioning protrusion 1151 and the positioning recess 1224 so as to improve a stability of the rotation of the upper tray 13.

In this embodiment, the casing 11 may further include two blocking protrusions 116. The two blocking protrusions 116 are symmetrically disposed on the two side plates 112, respectively. The two blocking protrusions 116 are arranged symmetrically, and structures of the two blocking protrusions 116 are the same. Therefore, only one blocking protrusion 116 will be described below. When the upper tray 13 is located in the rotated position, the blocking protrusion 116 contacts and blocks the upper tray 13. Accordingly, the upper tray 13 can be more stably located in the rotated position.

In this embodiment, the server 10 may further include two fasteners 15. The two fasteners 15 are, for example, screws. Each movably supporting member 122 may further have a second through hole 1225. The two second through holes 1225 are arranged symmetrically. The casing 11 may further have two fastening holes 117. The two fastening holes 117 are, for example, screw holes. The two fastening holes 117 are symmetrically located on the two side plates 112, respectively, and corresponds to the two second through holes 1225, respectively.

The two fasteners 15, the two second through holes 1225 and the two fastening holes 117 are arranged symmetrically. In addition, structures of the two fasteners 15 are the same, structures of the two second through holes 1225 are the same, and structures of the two fastening holes 117 are the same. Therefore, only one fastener 15, one second through hole 1225 and one fastening hole 117 will be described below.

When the upper tray 13 is located in the operational position, the fastener 15 passes through the second through hole 1225 and is fastened into the fastening hole 117, so that the movably supporting member 122 is fixed to the side plate 112. Accordingly, the upper tray 13 can be firmly fixed to the operational position.

In this embodiment, the upper tray 13 may further include a handle 133. The handle 133 is located farthest away from the two first positioning members 132. The upper tray 13 can be moved more easily by the use of the handle 133.

In this embodiment, since the two fixed supporting member 121 and the two movably supporting members 122 are disposed on the casing 11, the upper tray 13 does not need to be removed when electronic components of the motherboard 20 disposed on the lower tray 14 need to be replaced. The motherboard 20 disposed on the lower tray 14 can be exposed via translational movement and rotation of the upper tray 13. Accordingly, the convenience of replacing electronic components can be enhanced.

In this embodiment, since the two supporting assemblies 12 include the two fixed supporting member 121 located farthest away from the power supply 30, a stability of supporting the upper tray 13 can be improved. However, the invention is not limited thereto. In other embodiments, the two supporting assemblies may not include the two fixed supporting member farthest away from the power supply.

In this embodiment, the server 10 includes two supporting assemblies 12, but the invention is not limited thereto. In other embodiments, the server may include one supporting assembly merely.

In this embodiment, each supporting assembly 12 includes two fixed supporting members 121 and a movably supporting member 122. The four fixed supporting members 121 are fixed to the two side plates 112, respectively, and the two movably supporting members 122 are movably disposed on the two side plates 112, respectively, such that two of the fixed supporting members 121 and one of the movably supporting members 122 are disposed on one of the side plates 112, and the other two fixed supporting members 121 and the other movably supporting member 122 are disposed on the other side plate 112. However, the invention is not limited thereto. In other embodiments, each supporting assembly may include one fixed supporting member and one movably supporting member. The fixed supporting member is fixed to one of the two side plates. The movably supporting member is movably disposed on one of the two side plates, and the movably supporting member and the supporting member are located on the same side plate.

In this embodiment, the lower tray 14 is fixedly disposed on the bottom plate 111, but the invention is not limited thereto. In other embodiments, the lower tray may be movably disposed on the bottom plate.

In this embodiment, the casing 11 includes four second guiding protrusions 113. Two of the second guiding protrusions 113 are disposed on one of the side plates 112, and the other two second guiding protrusions 113 are disposed on the other side plate 112. However, the invention is not limited thereto. In other embodiments, the casing may include two second guiding protrusions, and the two second guiding protrusions are disposed on the two side plates, respectively.

Figure 5:
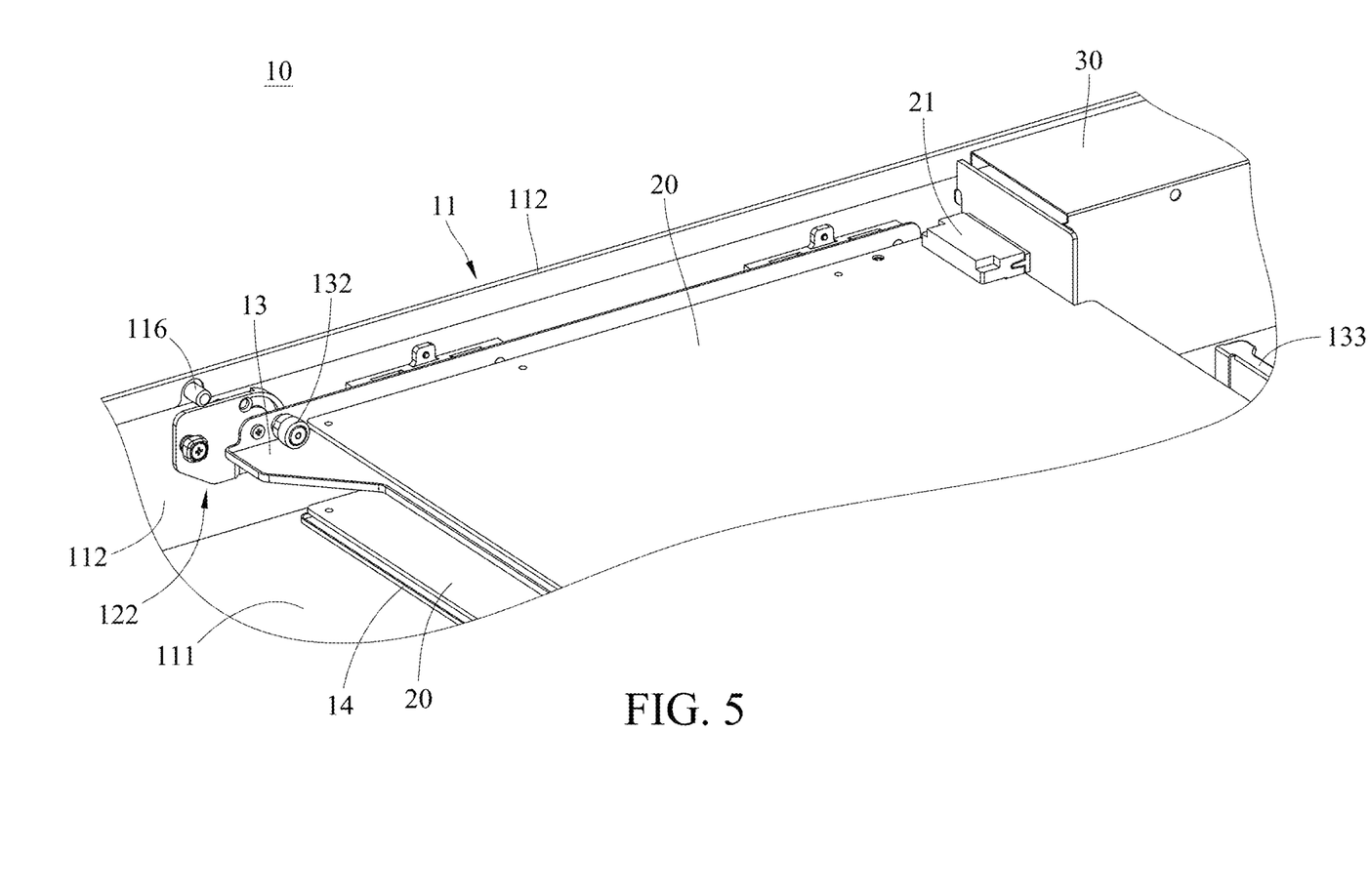
FIG. 5 is a perspective view showing that the server in FIG. 1 is located in an operational position.
Figure 6:
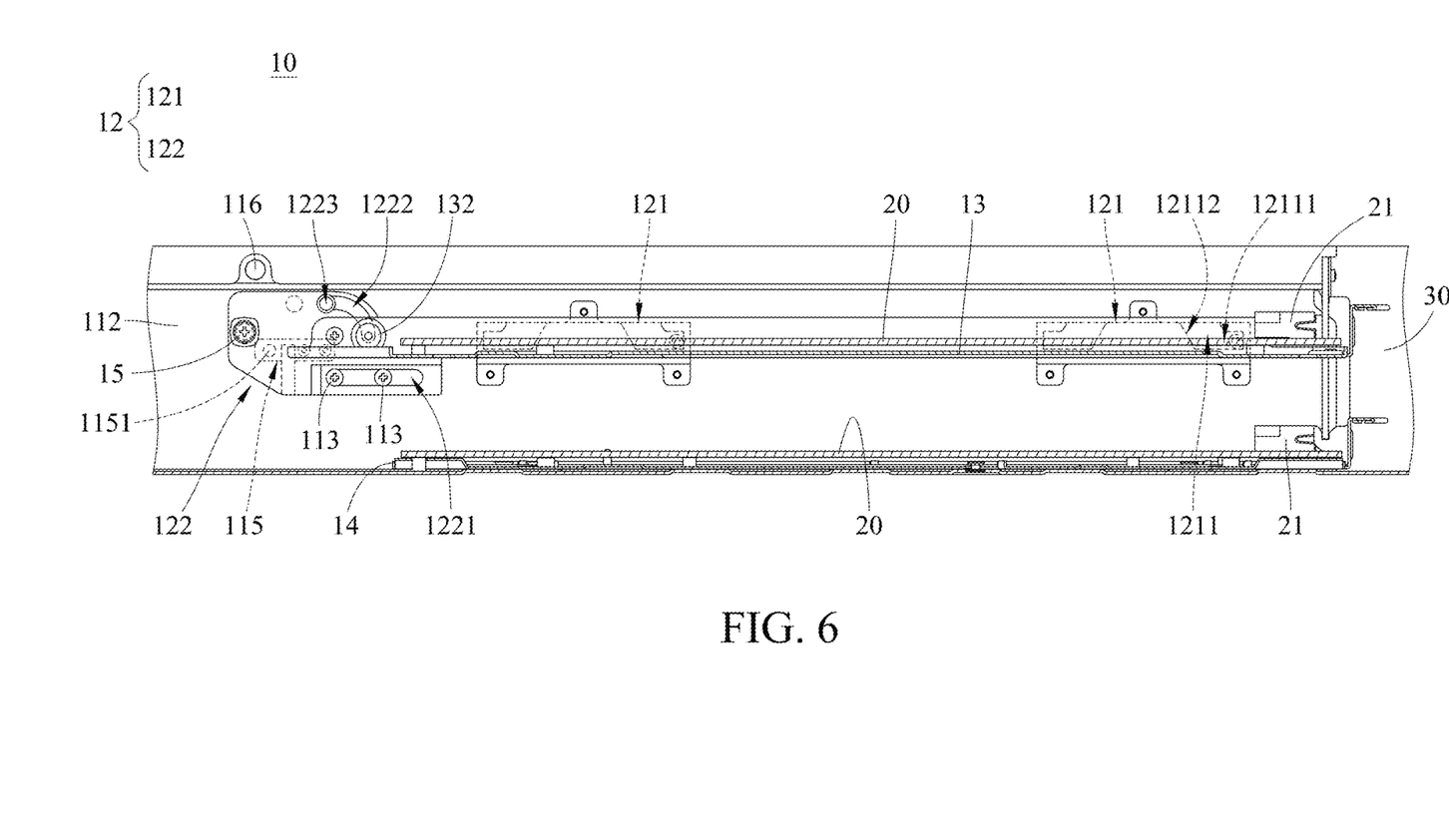
FIG. 6 is a cross-sectional view showing that the server in FIG. 1 is located in the operational position.
Figure 7:
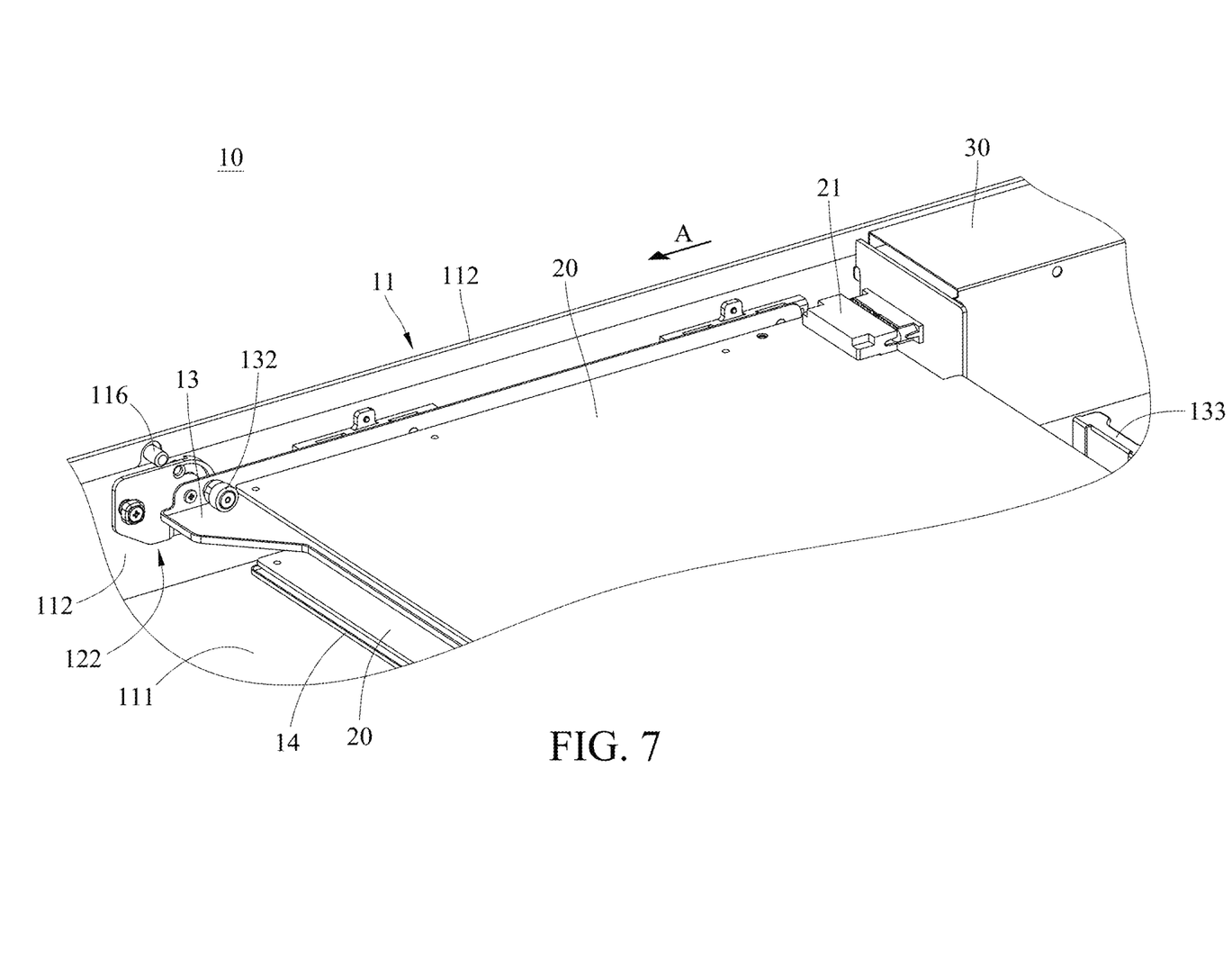
FIG. 7 is a perspective view showing that the server in FIG. 1 is located in a translation position.
Figure 8:
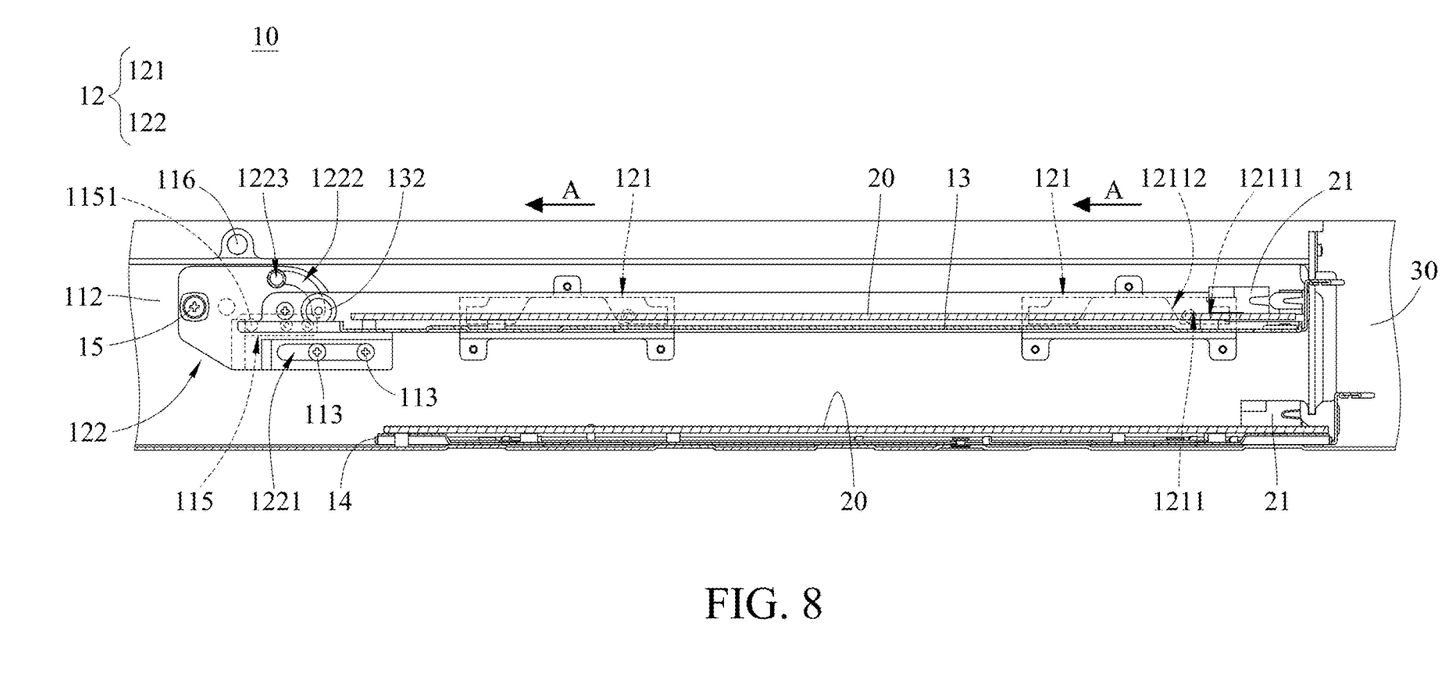
FIG. 8 is a cross-sectional view showing that the server in FIG. 1 is located in the translation position.
Figure 9:
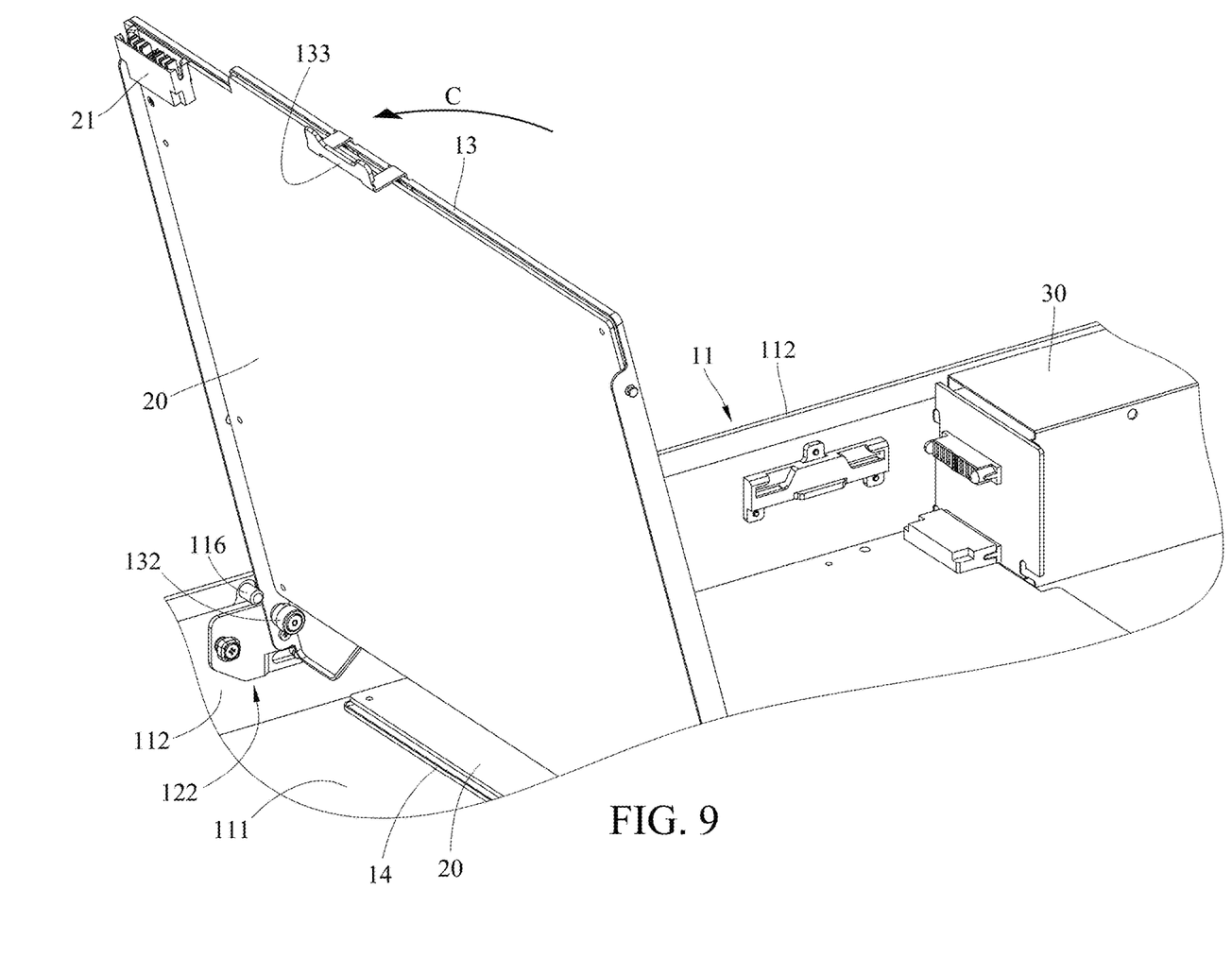
FIG. 9 is a perspective view showing that the server in FIG. 1 is located in a rotated position.
Figure 10:
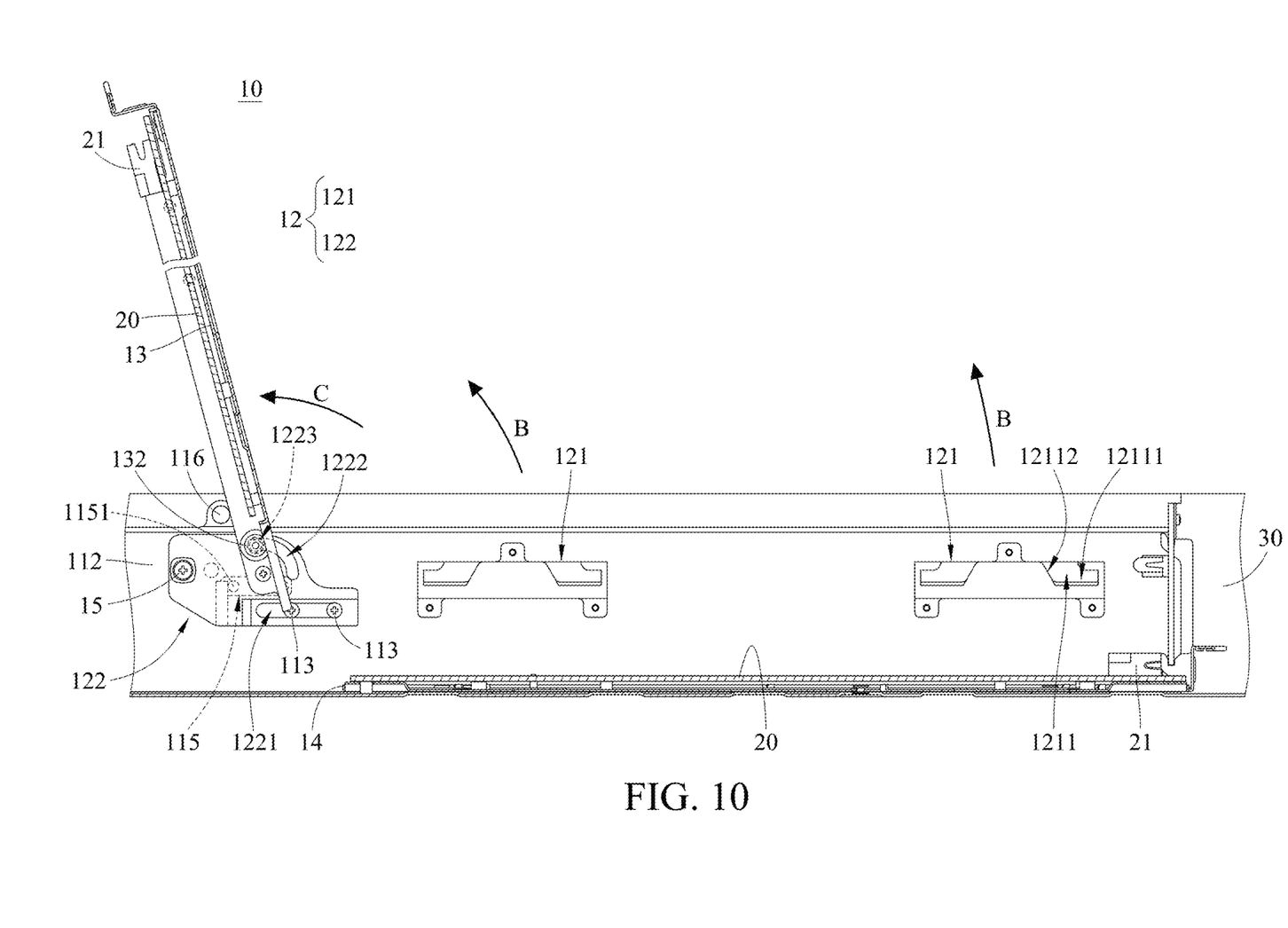
FIG. 10 is a cross-sectional view showing that the server in FIG. 1 is located in the rotated position.

Please refer to FIG. 5 to FIG. 10, where FIG. 5 is a perspective view showing that the server 10 in FIG. 1 is located in the operational position, FIG. 6 is a cross-sectional view showing that the server 10 in FIG. 1 is located in the operational position, FIG. 7 is a perspective view showing that the server 10 in FIG. 1 is located in the translation position, FIG. 8 is a cross-sectional view showing that the server 10 in FIG. 1 is located in the translation position, FIG. 9 is a perspective view showing that the server 10 in FIG. 1 is located in the rotated position, and FIG. 10 is a cross-sectional view showing that the server 10 in FIG. 1 is located in the rotated position.

As shown in FIG. 5 and FIG. 6, only a side of the casing 11 will be described below. The first guiding protrusions 131 is located at the end of the lateral guiding portion 12111 located farthest away from the oblique guiding portion 12112, and the end of the second guiding groove 1221 contacts one of the second guiding protrusions 113, such that the upper tray 13 is located in the operational position. In addition, the movably supporting member 122 is fixed to the side plate 112 via the fastener 15. At this time, the motherboard 20 disposed on the upper tray 13 is electrically connected to the power supply 30 via one of the electrical connector 21.

As shown in FIG. 7 and FIG. 8, when the electronic components of the motherboard 20 disposed on the lower tray 14 need to be replaced, the movably supporting member 122 is firstly released from the side plate 112, and the upper tray 13 is moved along a direction A. Accordingly, the first guiding protrusions 131 of the upper tray 13 is moved from the end of the lateral guiding portion 12111 farthest away from the oblique guiding portion 12112 to the end of the lateral guiding portion 12111 connected to the oblique guiding portion 12112 along the direction A. The movably supporting member 122 is also moved along the direction A, such that another end of the second guiding groove 1221 contacts the other second guiding protrusion 113. At this time, the upper tray 13 is moved from the operational position to the translation position, such that the motherboard 20 disposed on the upper tray 13 is separated from the power supply 30. In addition, the positioning protrusion 1151 of the second positioning member 115 is positioned in the positioning recess 1224.

As shown in FIG. 9 and FIG. 10, then, the first positioning member 132 of the upper tray 13 is moved from the end of the arc-shaped groove 1222 located farthest away from the first through hole 1223 to the first through hole 1223 along a direction B, and the first guiding protrusion 131 is moved from the end of the lateral guiding portion 12111 connected to the oblique guiding portion 12112 toward the end of the oblique guiding portion 12112 located farthest away from the lateral guiding portion 12111 along a direction C. At this time, the upper tray 13 is moved from the translation position to the rotated position, and securely held in the rotated position through the interaction of the first positioning member 132 with the positioning hole 114 and the obstruction caused by the blocking protrusion 116. Accordingly, the motherboard 20 disposed on the lower tray 14 can be exposed, thereby enhancing the convenience of replacing electronic components.

According to the server disclosed by the above embodiment, since the two fixed supporting member and the two movably supporting members are disposed on the casing of the server, the upper tray does not need to be removed when the electronic components of the motherboard disposed on the lower tray need to be replaced. The motherboard disposed on the lower tray can be exposed via translational movement and rotation of the upper tray. Accordingly, the convenience of replacing electronic components can be enhanced.

It will be apparent to those skilled in the art that various modifications and variations can be made to the invention. It is intended that the specification and examples be considered as exemplary embodiments only, with the scope of the invention being indicated by the following claims.

What is claimed is:

1. A server, configured to accommodate two motherboards, comprising:
   a casing, comprising a bottom plate and two side plates, wherein the two side plates are connected to two opposite sides of the bottom plate, respectively;
   at least one supporting assembly, comprising:
      at least one fixed supporting member, fixed to one of the two side plates; and
      at least one movably supporting member, movably disposed on one of the two side plates, wherein the at least one movably supporting member and the at least one fixed supporting member are located on a same one of the two side plates; and
   an upper tray, wherein a side of the upper tray is pivotally disposed on the at least one movably supporting member, another side of the upper tray is movably disposed on the at least one fixed supporting member, the upper tray and the at least one movably supporting member are movable relative to the at least one fixed supporting member, the upper tray is rotatable relative to the at least one movably supporting member, one of the two motherboards is disposed on the upper tray, and another of the two motherboards is disposed on the bottom plate.

2. The server according to claim 1, further comprising a lower tray disposed on the bottom plate, wherein the another of the two motherboards is disposed on the lower tray.

3. The server according to claim 1, wherein the server comprises two supporting assemblies, each of the two supporting assemblies comprises two fixed supporting members and one movably supporting member, and the two supporting assemblies are disposed on the two side plates, respectively.

4. The server according to claim 1, wherein the at least one fixed supporting member has a first guiding groove, the upper tray comprises at least one first guiding protrusion, the at least one first guiding protrusion is movably located in the first guiding groove, the at least one movably supporting member has a second guiding groove, the casing comprises at least one second guiding protrusion, the at least one second guiding protrusion is disposed on one of the two side plates, the at least one second guiding protrusion is located in the second guiding groove, and the at least one movably supporting member is movable relative to the at least one second guiding protrusion.

5. The server according to claim 4, wherein the first guiding groove has a lateral guiding portion and an oblique guiding portion, an end of the lateral guiding portion is connected to an end of the oblique guiding portion, the at least one first guiding protrusion is moved in the lateral guiding portion to force the upper tray to be located in an operational position or a translation position; when the at least one first guiding protrusion is located at an end of the lateral guiding portion located farthest away from the oblique guiding portion, the upper tray is located in the operational position; when the at least one first guiding protrusion is located at an end of the lateral guiding portion connected to the oblique guiding portion, the upper tray is located in the translation position.

6. The server according to claim 5, wherein the upper tray comprises at least one first positioning member, the at least one movably supporting member has an arc-shaped groove and a first through hole, the casing has a positioning hole, the first through hole is located at an end of the arc-shaped groove, the at least one first positioning member is movably located in the arc-shaped groove, the positioning hole is located at one of the two side plates, the positioning hole corresponds to the first through hole; when the upper tray is located in the translation position, the at least one first positioning member is located at an end of the arc-shaped groove located farthest away from the first through hole; when the at least one first positioning member is moved to the first through hole in the arc-shaped groove and the at least one first guiding protrusion is moved from the end of the lateral guiding portion connected to the oblique guiding portion toward an end of the oblique guiding portion located farthest away from the lateral guiding portion, the upper tray is moved from the translation position to a rotated position, and the at least one first positioning member passes through the first through hole and is positioned in the positioning hole so as to securely position the upper tray on one of the two side plates.

7. The server according to claim 6, wherein the casing comprises at least one second positioning member disposed on one of the two side plates, the at least one second positioning member is located between one of the two side plates and the at least one movably supporting member, the at least one movably supporting member has at least one positioning recess, when the upper tray is located in the rotated position, the at least one second positioning member is positioned in the at least one positioning recess.

8. The server according to claim 7, wherein the casing comprises at least one blocking protrusion located on one of the two side plates, the at least one blocking protrusion and the at least one supporting assembly are located on a same one of the two side plates; when the upper tray is located in the rotated position, the at least one blocking protrusion contacts and blocks the upper tray.

9. The server according to claim 6, wherein the upper tray comprises a handle located farthest away from the at least one first positioning member.

10. The server according to claim 5, further comprising at least one fastener, wherein the at least one movably supporting member has a second through hole, the casing has at least one fastening hole located on one of the two side plates, the at least one fastening hole corresponds to the second through hole, when the upper tray is located in the operational position, the at least one fastener passes through the second through hole, and the at least one fastener is fastened into the at least one fastening hole to fix the at least one movably supporting member to one of the two side plates.

* * * * *